(12) United States Patent
Kokal et al.

(10) Patent No.: US 12,038,341 B2
(45) Date of Patent: Jul. 16, 2024

(54) METHOD FOR ADJUSTING A PIEZOELECTRIC TORQUE SENSOR

(71) Applicants: AVL LIST GMBH, Graz (AT); PIEZOCRYST ADVANCED SENSORICS GMBH, Graz (AT)

(72) Inventors: Helmut Kokal, Graz (AT); Alexander Schricker, Graz (AT); Gregor Griesser, Rottenmann (AT)

(73) Assignees: AVL List GmbH, Graz (AT); Piezocryst Advanced Sensorics GmbH, Graz (AT)

( * ) Notice: Subject to any disclaimer, the term of this patent is extended or adjusted under 35 U.S.C. 154(b) by 0 days.

(21) Appl. No.: 17/912,440

(22) PCT Filed: Mar. 16, 2021

(86) PCT No.: PCT/AT2021/060091
§ 371 (c)(1),
(2) Date: Sep. 16, 2022

(87) PCT Pub. No.: WO2021/184054
PCT Pub. Date: Sep. 23, 2021

(65) Prior Publication Data
US 2023/0133592 A1 May 4, 2023

(30) Foreign Application Priority Data
Mar. 18, 2020 (AT) .............. A 50233/2020

(51) Int. Cl.
*G01L 25/00* (2006.01)
*G01L 3/10* (2006.01)
*G01M 13/027* (2019.01)
(52) U.S. Cl.
CPC ............ *G01L 25/003* (2013.01); *G01L 3/108* (2013.01); *G01M 13/027* (2013.01)

(58) Field of Classification Search
CPC ..... G01L 25/003; G01L 3/108; G01M 13/027; G01M 15/02
See application file for complete search history.

(56) References Cited

U.S. PATENT DOCUMENTS

| | | | |
|---|---|---|---|
| 7,117,754 B2 * | 10/2006 | Neely | H02P 6/10 73/862.333 |
| 8,726,715 B2 * | 5/2014 | Cottogni | G01L 25/003 73/1.09 |
| 2011/0167890 A1 * | 7/2011 | Cottogni | G01L 25/003 73/1.09 |

FOREIGN PATENT DOCUMENTS

| | | |
|---|---|---|
| AT | 11331 | 8/2010 |
| DE | 102007040106 | 2/2009 |
| WO | WO 2019/144172 | 8/2019 |

OTHER PUBLICATIONS

Gao et al. "Principle and manufacture of a new type of torque sensor based on the torsional effect of a piezoelectric quartz disc," Measurement Science and Technology, Feb. 2006, vol. 17, No. 2, pp. 323-330.

(Continued)

*Primary Examiner* — Freddie Kirkland, III
(74) *Attorney, Agent, or Firm* — Sheridan Ross P.C.

(57) ABSTRACT

The invention relates to a method for adjusting a piezoelectric torque sensor of a measuring apparatus, which can be part of a test bench, for determining a torque applied to a test piece due to a force flux, wherein the measuring apparatus comprises a piezoelectric torque sensor and a second torque sensor based on a different measuring principle which is designed to continuously detect static torques, wherein the measuring apparatus is configured such that both torque sensors measure torques in the force flux, whereby a target measurement signal of the piezoelectric torque sensor is determined on the basis of a torque measurement by the (Continued)

second torque sensor, and whereby the detected measurement signal of the piezoelectric torque sensor is adjusted and output on the basis of the determined target measurement signal.

17 Claims, 2 Drawing Sheets

(56) References Cited

OTHER PUBLICATIONS

Ohzeki et al. "Development of a Magnetostrictive Torque Sensor for Milling Process Monitoring," Journal of Manufacturing Science and Engineering, Nov. 1999, vol. 121, No. 4, pp. 615-620.
International Search Report and Written Opinion for International (PCT) Patent Application No. PCT/AT2021/060091, dated Jun. 28, 2021, 11 pages.
English Translation of the International Search Report for International (PCT) Patent Application No. PCT/AT2021/060091, dated Jun. 28, 2021, 3 pages.

* cited by examiner

METHOD FOR ADJUSTING A PIEZOELECTRIC TORQUE SENSOR

CROSS REFERENCE TO RELATED APPLICATIONS

This application is a national stage application under 35 U.S.C. 371 and claims the benefit of PCT Application No. PCT/AT2021/060091 having an international filing date of 16 Mar. 2021, which designated the United States, which PCT application claimed the benefit of Austria Patent Application No. A 50233/2020 filed 18 Mar. 2020, the disclosures of each of which are incorporated herein by reference in their entireties.

FIELD OF THE INVENTION

The invention relates to a method for adjusting a piezoelectric torque sensor of a measuring apparatus, preferably a test bench, for determining a torque applied to a test piece, wherein the measuring apparatus comprises a piezoelectric torque sensor.

BACKGROUND

In the developing and regulating of motors, particularly internal combustion engines or electric machines, it is important to have the most accurate possible knowledge of the torque on the motor shaft, particularly in test bench operation.

To that end, the use of measuring systems having strain gauges and/or piezoelectric sensors is known from the prior art.

Strain gauges and similar measuring elements generally serve in measuring static forces. Generally speaking, however, due to their structure, measuring systems with such type of measuring elements have too long of a response time to measure dynamic force curves.

Piezoelectric torque sensors have piezoelements which, upon a force being applied, generate a voltage based on the piezoelectric effect.

This is based on the principle of the piezoelement being subjected to electrical voltages upon its elastic deformation. Deformation of a piezoelectric element causes microscopic dipoles to form within the elementary cells of the piezoelement. Summation of the associated electric field in all of the piezoelement's elementary cells upon deformation and/or action of a force results in macroscopically measurable electric voltage. The charge displacement is normally measured by means of charge voltage converters, also known as charge amplifiers.

SUMMARY OF THE INVENTION

Very good measurement of transient forces or respectively forces occurring with a certain frequency is enabled when using the piezoelectric measuring element/piezoelement measuring principle. The piezoelement measuring principle is however less suited to measuring a force over a longer period of time, for example a stationary force, since the measuring signal is subject to a time drift. Piezoelements are therefore suited to measuring dynamic tensile, compressive and shear forces. They have a wide dynamic range, are rigid and can also measure high-dynamic forces at simultaneously high resolution. Due to their structure, piezoelectric sensors have a very high natural frequency and therefore barely impact the system to be measured.

Document WO 2019/144172 A1 makes known a measuring apparatus for determining a force and/or torque on a torque-transmitting shaft supported by a bearing apparatus, particularly a machine, the output and/or input shaft of which is formed by the torque transmission in the shaft, wherein the measuring apparatus comprises at least two, preferably three or four piezoelements and a fixing device, wherein the fixing device supports the piezoelements and is designed such that the piezoelements can measure a force, particularly shear force, between the bearing apparatus and a supporting apparatus for supporting the bearing apparatus.

The task of the invention is that of expanding a measurement spectrum of a measuring apparatus for measuring torque with a piezoelectric torque sensor. Particularly a task of the invention is providing a method for adjusting a piezoelectric torque sensor of a measuring apparatus for a low-frequency torque oscillation range and a test bench via which such an adjustment can be realized.

This task is solved by the teaching of the independent claims. Advantageous embodiments are claimed in the subclaims.

A first aspect of the invention relates to a method for adjusting a piezoelectric torque sensor of a measuring apparatus which is preferably part of a test bench for determining a torque applied to a test piece due to a flux of force, wherein the measuring apparatus comprises a piezoelectric torque sensor and a second torque sensor based on a different measuring principle designed to continuously detect static torques, wherein the measuring apparatus is configured such that both torque sensors measure torques in the force flux, whereby a target measurement signal of the piezoelectric torque sensor is determined on the basis of a torque measurement by the second torque sensor, and whereby the detected measurement signal of the piezoelectric torque sensor is adjusted and output on the basis of the determined target measurement signal.

A second aspect of the invention relates to a test bench for machines, preferably electric machines, for measuring dynamic torques, wherein the test bench comprises a piezoelectric torque sensor and a second torque sensor based on a different measuring principle designed so as to continuously detect a static component of the torque, whereby both torque sensors are configured and arranged on the test bench so as to measure torques in a force flux on the test bench.

A third aspect of the invention relates to a measuring apparatus for machines, preferably electric machines, for measuring dynamic torques, wherein the measuring apparatus comprises a piezoelectric torque sensor and second torque sensor based on a different measuring principle designed so as to continuously detect a static component of the torque, whereby both torque sensors are configured and arranged so as to measure torques in a single force flux.

Preferably, the measuring apparatus and/or the test bench is designed to test specimens at high speeds of greater than approximately 10,000 rpm, preferentially greater than approximately 35,000 rpm, and most preferentially greater than approximately 100,000 rpm.

A measurement spectrum within the meaning of the invention is preferably that frequency range in which a measuring apparatus can perform useful measurements.

A test piece within the meaning of the invention is preferably a machine to be tested or the totality of a machine to be tested and a shaft and/or a shaft assembly. Preferably, the individual elements of a test piece are connected together in a rotating fixed manner.

An adjustment within the meaning of the invention is preferably a setting or correcting of a measured value displayed by a measuring apparatus to the smallest possible deviation from a reference value of a reference instrument constituting a target value. In general, a measuring apparatus is adjusted when there is an unacceptably high measurement deviation between the displayed value of a measurement of the measuring apparatus and that of the reference instrument during a calibration. In the adjustment according to the invention, particularly signal drift of a piezoelectric torque sensor is corrected by means of the signal from a sensor configured to continuously detect static torques. Preferably, the inventive adjustment does not detect further deviations induced for example by other effects in a frequency range of oscillation frequency other than that as considered during the adjustment.

A force flux within the meaning of the invention is a path of force and/or torque in a mechanical system from a point of application, in particular a point of introduction, to a point or multiple points at which the force and/or torque can be absorbed by a reactive force and/or reactive torque. Preferably, the force flux comprises a force, particularly a force transverse to the shaft's rotational direction, and a torque, particularly about the rotational axis.

A power flux within the meaning of the invention is a path of power transmission in a mechanical system from a point of introduction to a point or multiple points at which the power is drawn off.

A quasi-stationary frequency range within the meaning of the invention preferably exhibits an oscillation frequency at which measurements can be performed by both torque sensors, each in the torque sensor's state of equilibrium. In particular, when in such a state of equilibrium, there are no significant test bench vibration-induced measurement differences at the individual measurement positions and there is a comparatively short response time of the second torque sensor relative to a rate of torque change. In contrast to measurements at higher frequencies, drift also occurs in the piezoelectric torque sensor measurement in such a state.

A means within the meaning of the invention can be hardware and/or software and comprising in particular particularly a digital processing unit, in particular a microprocessor unit (CPU), preferably data-connected or respectively signal-connected to a memory or bus system, and/or one or more programs or program modules. The CPU can thereby be designed to process commands implemented as a program stored in a memory system, detect input signals from a data bus and/or send output signals to a data bus. A memory system can comprise one or more, in particular different, storage media, particularly optical, magnetic solid-state and/or other non-volatile media. The program can be provided so as to embody or be capable of performing the methods described herein and such that the CPU executes the steps of such methods.

A measuring flange within the meaning of the invention is preferably a torque sensor having two flanges between which an applied torque can be measured.

The invention is based on the knowledge that if sufficient distance is maintained to potential modes of natural oscillation or respectively resonance of a test bench arrangement, it is possible to effect an adjustment of a piezoelectric torque sensor by means of a second torque sensor arranged in the same force flux as the piezoelectric torque sensor.

A reference signal is thereby measured by the second torque sensor in the force flux in which the piezoelectric torque sensor also measures the torque. The target measurement signal of the piezoelectric torque sensor is calculated on the basis of this reference signal. The measurement signal of the piezoelectric torque sensor can be adjusted by means of said target measurement signal. This adjustment-corrected measurement signal can then be output to a user or for further data processing via a data interface.

The dynamic component of the torque can be measured with great accuracy via the piezoelectric torque sensor. In contrast, however, a comparatively large piezoelement signal drift comes into play with the low-frequency component of the torque such that the piezoelectric torque sensor can only inaccurately detect this component. The second torque sensor, on the other hand, measures a static component of the torque at low-frequency torques yet cannot model the high-frequency signal component. Low-frequency operating conditions exist particularly when the test piece has an oscillation frequency of less than 10 Hz. Generally speaking, test benches exhibit natural oscillations in the range of 50 Hz to 80 Hz. An adjustment should therefore be made at an oscillation frequency of no more than 10 Hz in order to be able to exclude the influence of natural oscillations.

The inventive measuring apparatus can regularly or continuously perform such an adjustment or respectively readjustment for the piezoelectric torque sensor in order to also be able to precisely measure torques at frequencies below 1 Hz. The invention thus also enables the measuring of stationary forces/torques.

Consequently, the invention enables expanding the measurement spectrum of the piezoelectric torque sensor into the low-frequency oscillating range, in particular into the static range.

In one advantageous embodiment of the method, the target measurement signal of the piezoelectric torque sensor is furthermore determined on the basis of a shaft speed measurement. Factoring in the speed of the shaft enables different moments of inertia in different parts of a powertrain, or test piece respectively, to be taken into account during adjustment.

In a further advantageous embodiment of the method, the target measurement signal of the piezoelectric torque sensor is determined using the following equation:

$$M_{Piezo\_cal} = M_W - (J_W + J_{UUT})\dot{\omega}_W - M_R$$

whereby $M_{Piezo\_cal}$ is the target measurement signal, $M_W$ is the torque measured by the second torque sensor on a shaft or a shaft assembly which is connected to the test piece in rotating fixed manner or is a component of the test piece, $J_W$ is a moment of inertia of a shaft or a shaft assembly which is connected to the test piece (5) in rotating fixed manner or is a component of the test piece (5), $J_{UUT}$ is the test piece moment of inertia, $\dot{\omega}_W$ is a time derivative of a measured speed of a shaft (10a, 10b, 10c) or shaft assembly connected to the test piece in rotating fixed manner or is a component of the test piece, and $M_R$ is a frictional torque caused in particular by a bearing and/or gear mechanism.

The inventors have recognized that this relatively simple equation, which in particular forms the basis for a model, can be used to determine a reliable value for the target measurement signal of the piezoelectric torque sensor in close correspondence with the actual value of the torque at the measurement point.

In a further advantageous embodiment of the method, a model of a measurement signal/target measurement signal control process is generated on the basis of detected measurement signals and concurrently determined target measurement signals, wherein subsequent to the model being generated, the detected measurement signal is adjusted via the model. The generation of a model allows speed-dependent adjustment without further measurements.

In a further advantageous embodiment of the method, the model is based on a transfer function, the parameters of which are determined from testing the test piece on the test bench by comparing a measurement signal detected by the piezoelectric torque sensor to a target measurement signal based on a torque measurement determined by the second torque sensor. A simple adjustment is thereby achieved.

In a further advantageous embodiment of the method, the piezoelectric torque sensor measures a reactive torque at least at one support point of the test piece in order to determine the correspondingly applied torque. Accordingly, in one advantageous embodiment of the test bench, the piezoelectric torque sensor is designed and arranged so as to be able to measure the force flux between a test piece and a supporting apparatus for supporting the test piece. The reactive torque by means of which the test piece is supported is ultimately determined here as well. By averaging a torque on a test piece on the basis of reactive torque, there is no need for measurements of rotating elements of a test piece in order to determine torque. This can thereby prevent changes to the moment of inertia of a measuring arrangement due to measuring apparatus on the rotating elements, for example a measuring flange, or even elasticities being introduced into a measuring arrangement.

The advantages and features described in relation to the first aspect of the invention apply accordingly to the second aspect of the invention and vice versa.

In one advantageous embodiment, the test bench comprises a load apparatus, in particular a dynamometer or a brake, for applying a load to a test piece. The use of a dynamometer enables dynamic measurements to be performed on the test bench.

In a further advantageous embodiment, the test bench comprises a gear mechanism, in particular a booster gear, which is arranged in the force flux between the load apparatus and the test piece, wherein the piezoelectric torque sensor is arranged so as to detect the torques on that side of the force flux relative to the gear mechanism on which the test piece can be arranged, and the second torque sensor is arranged so as to detect the torques on that side of the force flux relative to the gear mechanism on which the load apparatus is arranged.

In particular, the invention is particularly advantageous in the case of a test bench arrangement having a gear mechanism since the piezoelectric torque sensor is preferably arranged on that side of the force flux which rotates at high speed. The high-frequency oscillations generated by the gear mechanism can be determined here by means of the piezoelectric torque sensor. In contrast, the second torque sensor of a different design, in particular based on a strain gauge arrangement, measures torques on the side of the gearing which rotates at lower speed. This enables performing measurements at a low torque oscillation frequency, so-called quasi-stationary measurements or even stationary measurements. In particular, the force flux is converted from a low-dynamic force flux into a high-dynamic force flux. This conversion transforms the low-frequency portion of the torque oscillations. In particular, it is disadvantageous for the second torque sensor to be arranged on the side of the gearing rotating at a higher speed since torques with high oscillation frequencies cannot be determined using such a second torque sensor not based on the piezoelectric measuring principle. In particular, however, the equation as depicted above also applies to the relationships between a torque measured by the second torque sensor and the target measurement signal of the piezoelectric torque sensor.

In a further advantageous embodiment of the method, the shaft assembly comprises a gear mechanism, wherein the second torque sensor is arranged in the section rotating at a lower speed relative to the gear mechanism and the piezoelectric torque sensor is arranged in the section rotating at a higher speed relative to the gear mechanism. The invention is particularly advantageous with respect to this configuration since the piezoelectric torque sensor is able to readily determine the torque oscillations occurring in the higher speed section of the shaft assembly at very high oscillation frequency.

In a further advantageous embodiment, the test bench comprises a speed sensor which is configured and arranged to measure rotational speed relative to a test piece.

In a further advantageous embodiment of the test bench, the gear mechanism forms a shaft assembly with at least one shaft and the speed sensor is arranged so as to detect the rotational speed on that side of the shaft assembly relative to the gear mechanism on which the load apparatus is arranged.

In a further advantageous embodiment of the test bench, the measuring principle of the second torque sensor is based on strain gauges and the second torque sensor is preferably a measuring flange. Torque sensors based on strain gauges are particularly well-suited to stationary and quasi-stationary or low-frequency measurements of torque, or of the underlying forces respectively.

In a further advantageous embodiment, the test piece, the load apparatus and, if provided, the gear mechanism are supported on the same base.

In a further advantageous embodiment, the test bench comprises adjustment means for continuously adjusting the piezoelectric torque sensor, wherein the torques detected by the piezoelectric torque sensor are adjusted by the adjustment means using a model.

BRIEF DESCRIPTION OF THE DRAWINGS

Further features and advantages derive from the following description of the exemplary embodiments referencing the figures. Shown therein at least partly schematically.

DETAILED DESCRIPTION

Figure 1:
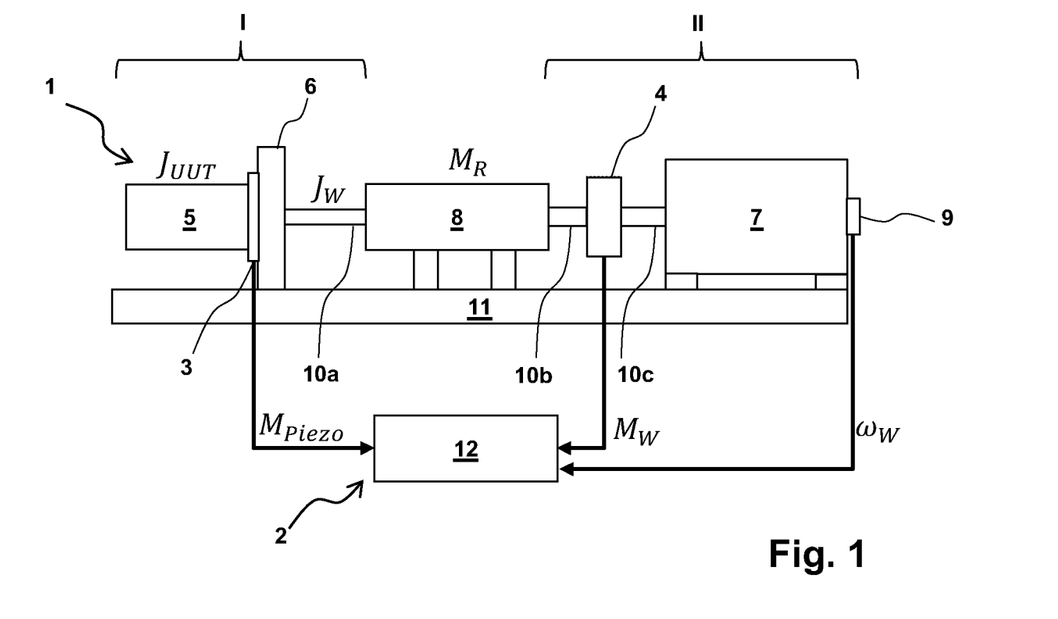
FIG. 1 an exemplary embodiment of a test bench having a piezoelectric torque sensor and a second torque sensor.

FIG. 1 shows an exemplary embodiment of a test bench 1 for testing machines.

The invention is explained in the following based on a test bench 1 for testing an electric machine 5. It is however obvious to the person skilled in the art that the exemplary embodiments as described are also applicable to other types of machines, particularly electromechanical energy converters or chemical-mechanical energy converters.

The test bench 1 preferably has a dynamometer 7 with which a load able to act upon the electric machine to be tested can be provided, in particular a driving torque or a braking torque.

The depicted test bench 1 preferably serves in testing electric machines which in regular operation operate at comparatively high speeds of more than 10,000 rpm, preferentially more than 35,000 rpm, and most preferentially more than 100,000 rpm. These are for example the electric drives of compressors such as turbochargers, for example, or electric drive motors for electric vehicles. A dynamometer 7 cannot provide or respectively accommodate such high speeds. Therefore, the test bench 1 preferably comprises a gear mechanism 8, in particular a so-called booster gear, which converts a rotational speed on the shaft sections 10*b*, 10*c* connecting the dynamometer 7 to the booster gear 8 in rotating fixed manner to a higher speed. This higher converted speed is transmitted to the electric machine 5 to be tested via the shaft section 10*a* connecting the booster gear 8 and the electric machine 5 to be tested in rotating fixed manner. Conversely, a rotational speed provided by the electric machine 5 to be tested via the booster gear 8 is converted into a speed and torque range within which the dynamometer 7 can be operated.

The gear mechanism 8 forms a shaft assembly together with various shafts or sections of a shaft 10*a*, 10*b*, 10*c*. Depending on which components are to be tested, a test piece is composed of the electric machine 5 alone or the electric machine 5 and at least part of the shaft assembly.

As FIG. 1 depicts, the dynamometer 7, the booster gear 8 and the electric machine 5 to be tested are mounted on the same base 11. The electric machine 5 to be tested is thereby supported against the base 11 by a supporting apparatus 6. The supporting apparatus 6 thereby provides those reactive forces for the electric machine 5 to be tested for supporting a force flux and a power flux between the electric machine 5 to be tested and the dynamometer 7.

Preferably, the supporting apparatus 6 is thereby designed, as shown in FIG. 1, such that the electric machine 5 to be tested is mounted on that side, in particular the front side, at which a shaft of the electric machine 5 is arranged or at which the shaft section 10*a* can be coupled to the shaft of the electric machine respectively. As shown in FIG. 1, this arrangement offers the advantage of the torque sensor 3 being able to be arranged between the supporting apparatus 6 and the electric machine to be tested 5 such that a large portion of the torque acting on the electric machine to be tested 5 is applied to the piezoelectric torque sensor 3. In particular, this arrangement enables minimizing or even eliminating a force shunt not running through the piezoelectric torque sensor 3. Preferably, with this type of bearing, the electric machine to be tested 5 has a passage for the shaft of the electric machine 5 to be tested or, respectively, the shaft or shaft section 10*a* through the piezoelectric torque sensor 3 and the supporting apparatus 6 as well as the piezoelectric torque sensor 3 and the supporting apparatus 6. This passage is preferably designed as a hole.

However, the electric machine 5 to be tested can also be mounted in a different way, for example on that side facing the base 11 or that side facing away from the base in a type of suspended support, or even on the other lateral sides of the electric machine 5 to be tested. Details on the supporting of the electric machine 5 to be tested as shown in FIG. 1 and further mounting options as well as on the determination of the reactive forces by means of the piezoelectric torque sensor 3 can be learned from the introductory part of document WO 2019/144172 A1.

The test bench arrangement of the test bench 1 is divided into two sides I, II by the booster gear 8. On a first side I, on which the electric machine 5 to be tested is arranged, the shaft assembly rotates at a higher speed, whereby a lower torque is applied to the shaft assembly. This section of the shaft assembly is thus also referred to as the first section I of the shaft assembly in the present description.

On the other output side of the booster gear 8, designated as second side II, shaft sections 10*b*, 10*c* rotate at lower speed and higher applied torque. Typically, the gear ratio of the booster gear 8 is approximately 3:1 to 10:1. This section of the shaft assembly is thus also referred to as the second section II of the shaft assembly in the present description.

The shaft assembly or respectively powertrain, which preferably consists of the electric motor 5, the shaft sections 10*a*, 10*b*, 10*c*, the booster gear 8 and the dynamometer 7, constitutes an oscillatory system. Depending on the design of the test bench 1 and the electric machine 5 to be tested, oscillation resonance or eigenmodes are typically greater than 50 Hz.

In order to determine the torque acting on the electric machine to be tested due to a force flux from or to the dynamometer 7, the test bench 1 comprises piezoelectric torque sensor 3. This torque sensor 3 preferably does not thereby directly determine the torque applied to the electric machine 5 to be tested via shaft section 10*a* but rather indirectly the reactive torque with which the electric machine 5 to be tested is supported on the supporting apparatus 6. Furthermore, the test bench 1 comprises a second torque sensor 4 which is not based on the piezoelectric measuring principle but rather uses another measuring principle to measure the torque. Preferably, so-called strain gauges as are generally known from the prior art are used here. Preferably, the second torque sensor 4 is designed as a measuring flange which measures the torque between the two shaft sections 10*b* and 10*c*.

The arrangement of the two torque sensors shown in FIG. 1 is particularly advantageous for the adjustment of the piezoelectric torque sensor 3 since more modest oscillations generally occur in the second section II of the shaft assembly which rotates at a lower speed and measurement by way of the second torque sensor 4 using strain gauges is consequently precise. Strain gauge-based sensors are namely only suitable for dynamic measurements to a limited extent.

In contrast, the piezoelectric torque sensor 3 is arranged in the first section I of the shaft assembly, directly on the electric machine 5 to be tested on which the applied torque is also to be determined. Due to the direct arrangement of the piezoelectric torque sensor on the test piece, a highly accurate measurement of the applied torque can be achieved.

A speed sensor 9 able to determine rpm is arranged to determine the rotational speed of the shaft assembly, particularly in the area of the second section of the shaft assembly II. In FIG. 1, the speed sensor 9 determines the speed of the dynamometer 7 shaft and thus the speed of shaft sections 10*b* and 10*c*. A rotational speed in the first section I of the shaft assembly can therefore also be inferred from the selected gear ratio of the booster gear 8.

Based on the torque $M_W$ measured by the second torque sensor 4 and the speed $\omega_W$ measured by speed sensor 9, a target measurement signal $M_{Piezo\_cal}$ can be calculated subject to the frictional torque $M_R$, induced in particular by a bearing and/or booster gear 8, the moment of inertia $J_W$ of the shaft assembly and the moment of inertia $J_{UUT}$ of the electric machine 5 to be tested. This will be explained in greater detail below in relation to the inventive method 100 for adjusting a piezoelectric torque sensor.

At the same time, the piezoelectric torque sensor 3 can measure an actual measurement signal $M_{Piezo}$ of the torque applied to the piezoelectric torque sensor 3.

In order to calibrate the actual measurement signal of the piezoelectric torque sensor 3, the test bench 1 preferably further comprises adjustment means 12. This is preferably part of a data processing system of the test bench 1, but can also be part of an external data processing system. After the actual torque signal $M_{Piezo}$ has been calibrated, the piezoelectric torque sensor 3 can be adjusted by means of the adjustment means 12. Preferably, a model stored in the adjustment means 12 is thereby used for the calibration/adjustment. This model will also be explained in greater detail below in relation to method 100.

Figure 2:
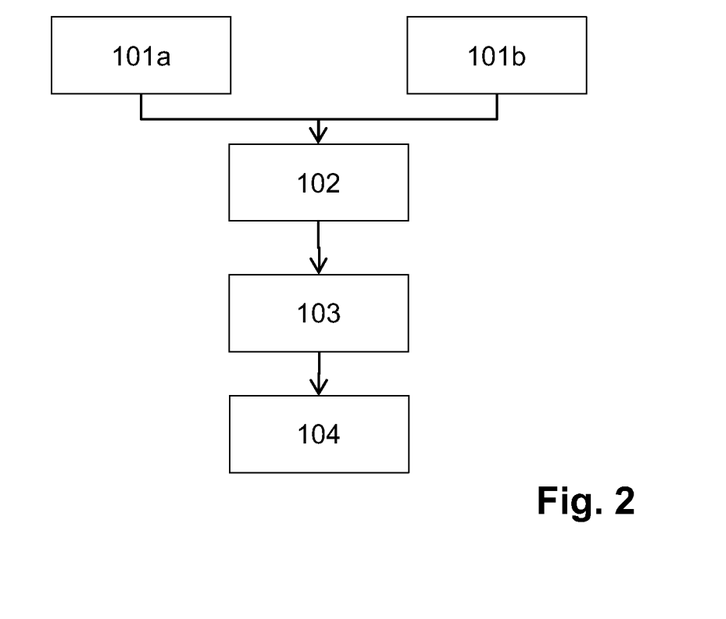
FIG. 2 a block diagram of a method for adjusting a piezoelectric torque.

FIG. 2 shows a block diagram of an exemplary embodiment of a method 100 for adjusting a piezoelectric torque sensor of a measuring apparatus 2. Preferably, such a measuring apparatus 2 is part of a test bench 1 as described above in relation to FIG. 1.

The adjusting of the piezoelectric torque sensor 3 occurs while the test bench is in operation. To that end, the electric machine 5 to be tested applies a torque to the dynamometer 7 via the shaft assembly or, vice versa, a torque is applied from the dynamometer 7 to the electric machine 5 to be tested.

Preferably, the test bench 1 is operated at comparatively low shaft assembly speeds during adjustment, wherein the speed in the second section II of the shaft assembly is preferably less than 50 rpm. Depending on the design of the test bench 1 and test piece, low torque oscillation frequencies of less than approximately 10 Hz, preferably less than approximately 5 Hz, even more preferentially less than approximately 1 Hz, are to be expected at rotational speeds in this range of magnitude.

These frequency ranges of oscillation frequencies are selected such that there is spacing from the resonant frequencies or eigenmodes of the total system consisting of test bench 1 and test piece. The resonant frequencies or eigenmodes are generally around 50 Hz.

Further preferably, these frequency ranges of oscillation frequencies suited to adjustment are isolated by means of a frequency filter, in particular using a Fourier analysis. In this case, the rotational speed during test bench operation is not significant to the adjustment.

During operation, the piezoelectric torque sensor 3 measures a torque applied to the electric machine 5 to be tested; 101a. As already explained with reference to FIG. 1, the reactive forces via which the electric machine 5 to be tested is supported on the supporting apparatus 6 are thereby preferably detected by the piezoelectric torque sensor 3. In contrast, the second torque sensor 4 detects a torque in the shaft assembly and thus at a relatively further distance from the electric machine 5 to be tested 5; 101b. In the case of a test bench 1 or test piece comprising a gear mechanism 8, as shown in FIG. 1, the second torque sensor 4 is preferably arranged in that region II of the shaft assembly with the lower prevailing rotational speed.

A target measurement signal $M_{Piezo\_cal}$ is calculated on the basis of the torque measurements $M_W$ by the second torque sensor 4 and the speed measurement $\omega_W$ by speed sensor 9; 102. Preferably, the target measurement signal is thereby determined on the basis of the following equation:

$$M_{Piezo\_cal} = M_W - (J_W + J_{UUT})\dot{\omega}_W - M_R$$

In principle, however, only the torque $M_W$ measured by means of the second torque sensor 3, potentially allowing for frictional torque $M_R$, can be used as an approximation in determining the target measurement signal $M_{Piezo\_cal}$.

The detected measurement signal $M_{Piezo}$ is corrected on the basis of the determined target measurement signal $M_{Piezo\_cal}$, 103. Further preferably, the corrected measurement signal is output; 104.

The correction of the measurement signal $M_{Piezo}$ detected by the piezoelectric torque sensor 3 is preferably made on the measurement signal/target measurement signal in a control process.

Figure 3:
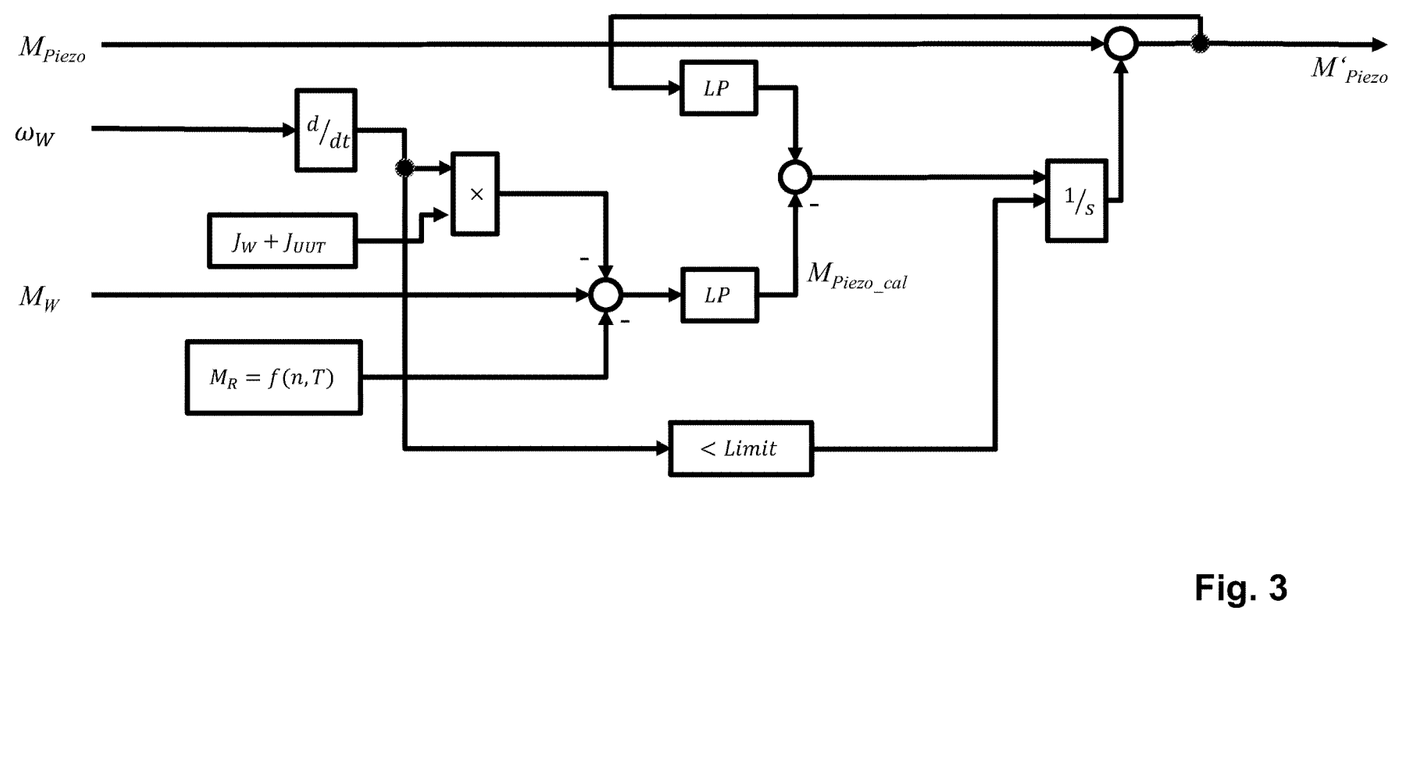
FIG. 3 an exemplary embodiment of a control process for adjusting a measurement signal of a piezoelectric torque sensor.

An exemplary embodiment of such a control process is depicted in FIG. 3.

Preferably, the measurement signal $M_{Piezo}$ is corrected by being compared to the target measurement signal $M_{Piezo\_cal}$. The correction values determined in this way, which are preferably determined at comparatively low torque oscillation frequencies, are applicable to the entire range of measurement, in particular also to higher torque oscillation frequencies.

In one preferential embodiment, a model can further be generated, by means of which the target measurement signal $M_{Piezo\_cal}$ can be determined as a function of the torque oscillation frequency based on the measurements of the second torque sensor 4.

Substantially, the control process shown in FIG. 3 represents the equation given above for calculating the target measurement signal $M_{Piezo\_cal}$.

The rotational speed of the shaft $\omega_W$ is derived over time and multiplied by the sum of the moments of inertia of the shaft assembly and the electric machine 5 to be tested. The frictional torque $M_R$, which is in particular a function of the speed n and a gear ratio T, and the previously calculated product are subtracted from the torque $M_W$ measured via the second torque sensor 4. The calculated signal is subjected to a low-pass filter LP, which yields the target measurement signal $M_{Piezo\_cal}$ This target measurement signal $M_{Piezo\_cal}$ is subtracted from a measurement signal $M_{Piezo}$ corrected on the basis of an old adjustment and likewise having been run through a low-pass filter LP. Preferably, the indicated low-pass filters LP thereby have the same characteristics, particularly the same dynamics, limit frequencies, orders and types. Providing the low-pass filter enables isolating those oscillation frequencies which are suited to adjusting the measurement signal of the piezoelectric torque sensor.

The difference is fed to an integrator 1/s. When the calculated acceleration of the shaft's rotation is less than limit value Limit, a previous adjustment is replaced by a new value of S in an integrator 1 and used to correct the measurement signal $M_{Piezo}$ measured by the piezoelectric torque sensor 3.

Allowing for a limit value Limit for the acceleration of the rotation ensures that there is only an adjustment change up to a certain oscillation frequency.

The exemplary embodiments described above are only examples which are in no way intended to limit the scope of protection, application and configuration. Rather, the foregoing description is to provide the person skilled in the art with a guideline for implementing at least one exemplary embodiment, whereby various modifications can be made, particularly as regards the function and arrangement of the described components, without departing from the scope of protection resulting from the claims of its and equivalent combinations of features. In particular, individual exemplary embodiments may be combined with one another.

LIST OF REFERENCE NUMERALS 1 test bench
2 measuring apparatus
3 piezoelectric torque sensor
4 second torque sensor
5 electric machine
6 supporting apparatus 7 dynamometer
8 gear mechanism
9 speed sensor
10a, 10b, 10c shaft
11 base
12 adjustment means

The invention claimed is:

1. A method for adjusting a piezoelectric torque sensor of a measuring apparatus and for determining a torque applied to a test piece due to a force flux, wherein the measuring apparatus comprises a piezoelectric torque sensor and a second torque sensor based on a different measuring principle which is designed to continuously detect static torques, wherein the measuring apparatus is configured such that both torque sensors measure torques in the force flux, whereby a target measurement signal of the piezoelectric torque sensor is determined on the basis of a torque measurement by the second torque sensor, and whereby a detected measurement signal of the piezoelectric torque sensor is adjusted and output on the basis of the determined target measurement signal.

2. The method according to claim 1, wherein the target measurement signal of the piezoelectric torque sensor is determined in a quasi-stationary frequency range of an oscillation frequency of the torque on the measuring apparatus.

3. The method according to claim 2, wherein the adjustment is made during test piece operation, wherein torque in a desired frequency range is isolated by means of a frequency filter, in particular using a Fourier analysis.

4. The method according to claim 2, wherein the target measurement signal of the piezoelectric torque sensor is determined in a frequency range below 50 Hz.

5. The method according to claim 1, wherein the target measurement signal of the piezoelectric torque sensor is determined in a frequency range of torque oscillation frequency in which no natural oscillation or respectively resonance modes occur in a test environment.

6. The method according to claim 5, wherein the target measurement signal of the piezoelectric torque sensor is determined in a frequency range of torque oscillation frequency in which no natural oscillation or respectively resonance modes occur on a test bench and at a torque oscillation frequency of less than approximately 20 Hz.

7. The method according to claim 1, wherein the target measurement signal of the piezoelectric torque sensor is further determined on the basis of a speed measurement in relation to the test piece.

8. The method according to claim 1, wherein the target measurement signal of the piezoelectric torque sensor is determined using the following equation:

$$M_{Piezo\_cal}=M_W-J_W J_{UUT})\dot{\omega}_W-M_R$$

wherein $M_{Piezo\_cal}$ is the target measurement signal, $M_W$ is the torque measured by the second torque sensor on a shaft or shaft assembly which is connected to the test piece in rotating fixed manner or is a component of the test piece, $J_W$ is a moment of inertia of a shaft or a shaft assembly which is connected to the test piece in rotating fixed manner or is a component of the test piece, and $J_{UUT}$ is the test piece moment of inertia, $\dot{\omega}_W$ is a time derivative of a measured speed of a shaft or shaft assembly which is connected to the test piece in rotating fixed manner or is a component of the test piece, and $M_R$ is a frictional torque caused in particular by a bearing and/or gear mechanism.

9. The method according to claim 8, wherein the shaft assembly comprises a gear mechanism and wherein the second torque sensor is arranged in a second section rotating at a lower speed relative to the gear mechanism and the piezoelectric torque sensor is arranged in a first section rotating at a higher speed relative to the gear mechanism.

10. The method according to claim 1, wherein the piezoelectric torque sensor measures a reactive torque at least at one support point of the test piece in order to determine a torque applied to the test piece.

11. A test bench for machines and for measuring dynamic torques, wherein the test bench is configured to realize a method according to claim 1, and wherein the test bench comprises:
a piezoelectric torque sensor;
an adjustment means configured to adjust the piezoelectric torque sensor; and
a second torque sensor based on a different measuring principle which is designed so as to continuously detect a static component of the torque,
whereby both torque sensors are configured and arranged on the test bench so as to measure torques in a force flux on the test bench.

12. A non-transitory computer-readable storage medium having stored thereon a computer program containing instructions, that when executed by a processing unit of a computer cause to be performed a method for adjusting a piezoelectric torque sensor of a measuring apparatus and for determining a torque applied to a test piece due to a force flux, wherein the measuring apparatus comprises a piezoelectric torque sensor and a second torque sensor based on a different measuring principle which is designed to continuously detect static torques, wherein the measuring apparatus is configured such that both torque sensors measure torques in the force flux, whereby a target measurement signal of the piezoelectric torque sensor is determined on the basis of a torque measurement by the second torque sensor, and whereby a detected measurement signal of the piezoelectric torque sensor is adjusted and output on the basis of the determined target measurement signal.

13. A test bench for machines and for measuring dynamic torques,
wherein the test bench comprises:
a piezoelectric torque sensor;
an adjustment means configured to adjust the piezoelectric torque sensor; and
a second torque sensor based on a different measuring principle which is designed so as to continuously detect a static component of the torques,
whereby both torque sensors are configured and arranged on the test bench so as to measure torques in a force flux on the test bench.

14. The test bench according to claim 13, wherein the piezoelectric torque sensor is designed and arranged so as to be able to measure a force in the force flux between a test piece and a supporting apparatus for supporting the test piece.

15. The test bench according to claim 13 having a load apparatus, in particular a dynamometer or a brake, for applying a load to a test piece.

16. The test bench according to claim 15 having a gear mechanism, in particular a booster gear, which is arranged in the force flux between the load apparatus and the test piece, wherein the piezoelectric torque sensor is arranged so as to detect the torques on a first side of the force flux relative to the gear mechanism on which the test piece can be arranged, and the second torque sensor is arranged so as to detect the torques on a second side of the force flux relative to the gear mechanism on which the load apparatus is arranged.

17. The test bench according to claim 13, wherein the measuring principle of the second torque sensor is based on strain gauges and the second torque sensor is preferably a measuring flange.

* * * * *